(12) United States Patent
Ishiguro

(10) Patent No.: US 11,778,122 B2
(45) Date of Patent: Oct. 3, 2023

(54) APPARATUS, METHOD, AND STORAGE MEDIUM FOR REMOVING SHADING DOTS

(71) Applicant: CANON KABUSHIKI KAISHA, Tokyo (JP)

(72) Inventor: Taisuke Ishiguro, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 267 days.

(21) Appl. No.: 17/369,741

(22) Filed: Jul. 7, 2021

(65) Prior Publication Data

US 2022/0021787 A1 Jan. 20, 2022

(30) Foreign Application Priority Data

Jul. 15, 2020 (JP) .................. 2020-121673

(51) Int. Cl.
*H04N 1/409* (2006.01)
*G06T 5/00* (2006.01)
*G06T 5/30* (2006.01)

(52) U.S. Cl.
CPC ........... *H04N 1/4092* (2013.01); *G06T 5/006* (2013.01); *G06T 5/30* (2013.01); *G06T 2207/10008* (2013.01); *G06T 2207/20192* (2013.01)

(58) Field of Classification Search
CPC ........ H04N 1/4092; H04N 1/409; G06T 5/30; G06T 2207/10008; G06T 2207/20192; G06V 30/164
See application file for complete search history.

(56) References Cited

U.S. PATENT DOCUMENTS

2021/0014383 A1* 1/2021 Ishiguro ................. H04N 1/405

FOREIGN PATENT DOCUMENTS

JP 2000293630 A 10/2000

* cited by examiner

*Primary Examiner* — King Y Poon
*Assistant Examiner* — Michael L Burleson
(74) *Attorney, Agent, or Firm* — CANON U.S.A., INC. IP Division

(57) ABSTRACT

According to an exemplary embodiment of the present disclosure, an isolated dot is removed from an image including a shading dot, and a shading dot in contact with a character is removed from the isolated dot-removed image based on a size of the removed isolated dot.

18 Claims, 10 Drawing Sheets

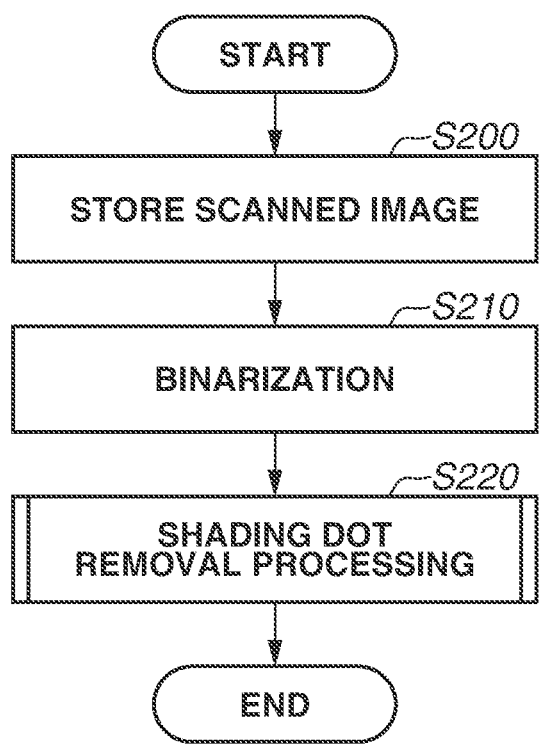

FIG.3A

INVOICE — 302, 301

FROM: ABC inc.
DATE: 2019/12/03
TO: XYZ Ltd.

| Item | q'ty | Price | Amount |
|---|---|---|---|
| ○× | 1 | 500 | 500 |
| ○△ | 2 | 500 | 1,000 |
| ○◇ | 3 | 1,000 | 3,000 |

| Balance Due | 4,500 |
|---|---|

FIG.3B

INVOICE — 304, 303

FROM: ABC inc.
DATE: 2019/12/03
TO: XYZ Ltd.

| Item | q'ty | Price | Amount |
|---|---|---|---|
| ○× | 1 | 500 | 500 |
| ○△ | 2 | 500 | 1,000 |
| ○◇ | 3 | 1,000 | 3,000 |

| Balance Due | 4,500 |
|---|---|

FIG.3C

INVOICE — 306, 305

FROM: ABC inc.
DATE: 2019/12/03
TO: XYZ Ltd.

| Item | q'ty | Price | Amount |
|---|---|---|---|
| ○× | 1 | 500 | 500 |
| ○△ | 2 | 500 | 1,000 |
| ○◇ | 3 | 1,000 | 3,000 |

| Balance Due | 4,500 |
|---|---|

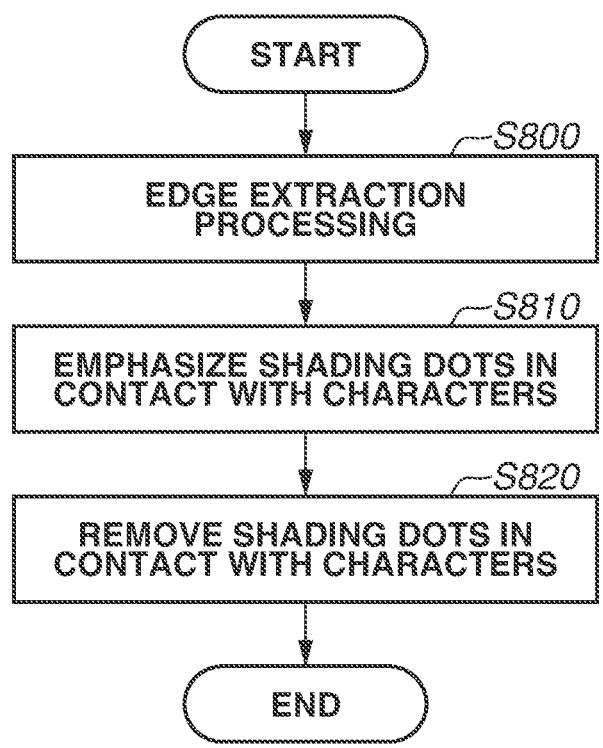

FIG.9A

APPARATUS, METHOD, AND STORAGE MEDIUM FOR REMOVING SHADING DOTS

BACKGROUND

Field

The aspect of the embodiments relates to an image processing apparatus, an image processing method, and a storage medium for removing shading dots from a document image.

Description of the Related Art

There have been known techniques for improving an optical character recognition (OCR) accuracy by identifying areas of shading dots and removing the shading dots in performing character recognition processing (OCR processing) on a document image (scanned image) read by a scanner or a camera.

Japanese Patent Application Laid-Open No. 2000-293630 discusses a technique for removing shading dots by performing a Fourier transform on a scanned image, deleting frequency components corresponding to predetermined shading dots, and then performing an inverse Fourier transform. The resulting image is then smoothed to remove projections.

According to the technique discussed in Japanese Patent Application Laid-Open No. 2000-293630, the frequency components characteristic of the shading dots are to be defined in advance. Shading dot patterns not definable in advance may therefore fail to be removed. In addition, the frequency components characteristic of shading dots in contact with characters can be different depending on the degree of contact. Such shading dots may be unable to be removed by the Fourier transform, and even unable to be removed by smoothing processing depending on the shape of the projections.

SUMMARY

According to an aspect of the embodiments, an apparatus includes at least one memory that stores instructions, and at least one processor that executes the instructions to perform removing an isolated dot from an image including a shading dot, and removing a shading dot in contact with a character from the isolated dot-removed image based on a size of the removed isolated dot.

Further features of the present disclosure will become apparent from the following description of exemplary embodiments with reference to the attached drawings.

BRIEF DESCRIPTION OF THE DRAWINGS

FIG. 2 is a flowchart illustrating a processing procedure according to a first exemplary embodiment.

FIGS. 3A to 3C are diagrams illustrating examples of document images.

FIG. 8 is a flowchart illustrating processing for removing shading dots in contact with characters.

FIGS. 9A to 9G are diagrams illustrating examples of document images in the processing for removing shading dots in contact with characters.

DESCRIPTION OF THE EMBODIMENTS

Figure 1:
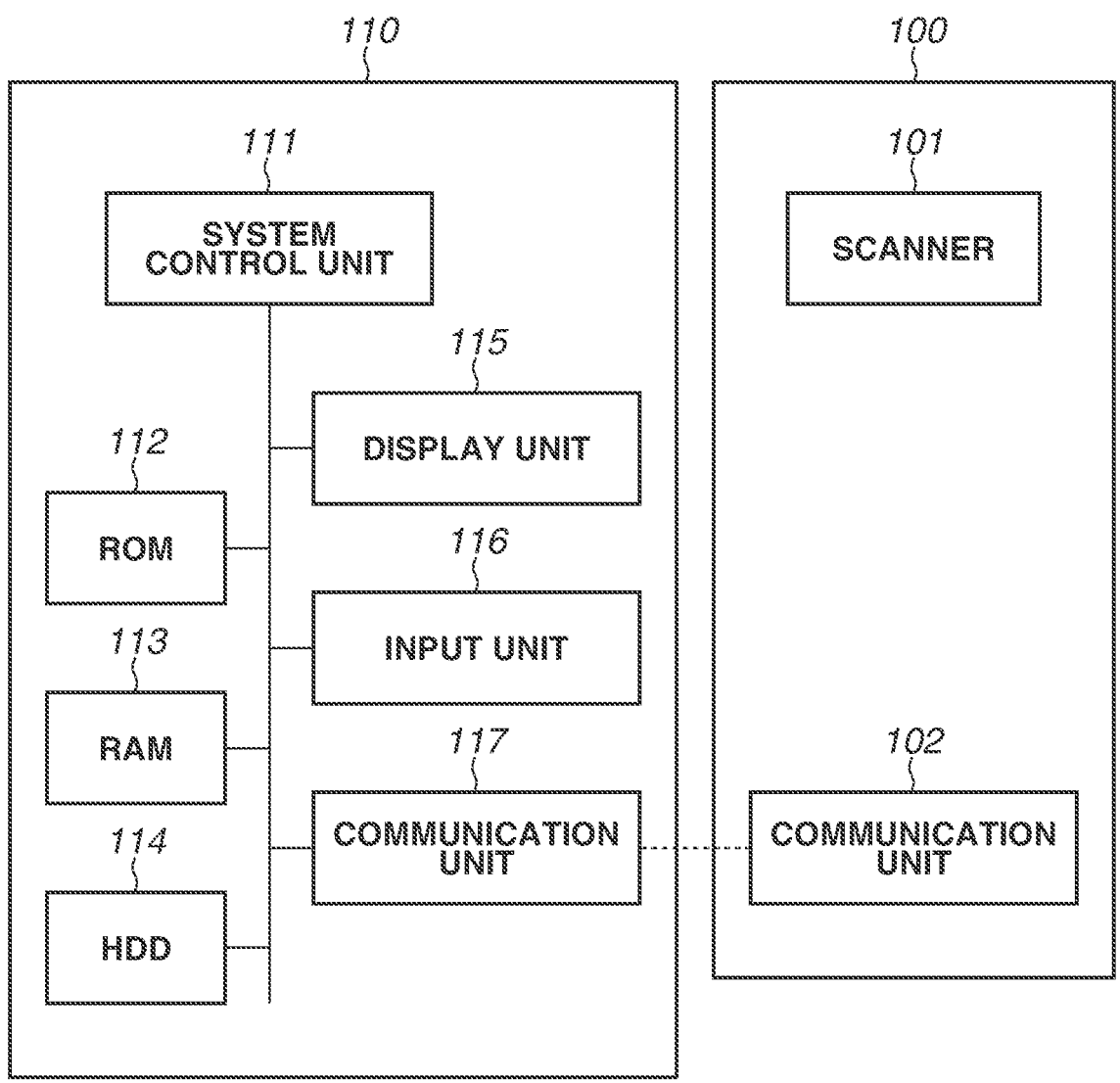
FIG. 1 is a diagram illustrating an information processing system.

A first exemplary embodiment of the present disclosure will be described below. FIG. 1 is a diagram illustrating an information processing system according to a first exemplary embodiment. The information processing system includes a reading apparatus 100 for reading a document and an image processing apparatus (information processing apparatus) 110. The reading apparatus 100 includes a scanner 101 and a communication unit 102. The scanner 101 reads a document and generates a scanned image. The communication unit 102 of the reading apparatus 100 communicates with the image processing apparatus 110 via a network.

The image processing apparatus 110 includes a system control unit 111, a read-only memory (ROM) 112, a random access memory (RAM) 113, a hard disk drive (HDD) 114, a display unit 115, and an input unit 116, and a communication unit 117. The system control unit 111 is a processor (computer) that functions as a processing unit for performing various types of processing by reading control programs stored in the ROM 112 or the HDD 114 and executing the control programs. In other words, the functions and processing of the image processing apparatus 110 to be described below are implemented by the system control unit 111 reading programs stored in the ROM 112 or the HDD 114 and executing the programs. The RAM 113 is used as a temporary storage device such as a main memory and a work area of the system control unit 111. The HDD 114 stores various types of data and programs. The communication unit 117 of the image processing apparatus 110 performs communication processing with the reading apparatus 100 and other external apparatuses via the network. The display unit 115 displays various types of information. The input unit 116 includes a keyboard and a mouse, and receives a user's various operations. The display unit 115 and the input unit 116 may be integrally formed like a touch panel.

In the present exemplary embodiment, the scanner 101 of the reading apparatus 100 reads a paper document, such as a business form, and generates a scanned image. The scanned image is transmitted to the image processing apparatus 110 via the communication unit 102 of the reading apparatus 100. In the image processing apparatus 110, the communication unit 117 receives the scanned image and stores the image data (scanned image) into a storage device, such as the HDD 114.

FIG. 2 is an example of a flowchart illustrating the processing of the image processing apparatus 110 according to the present exemplary embodiment.

In step S200, a scanned image generated by the scanner 101 scanning a paper document in response to the user's instruction is transmitted to the image processing apparatus 110 via the communication unit 102. The transmitted scanned image is received by the communication unit 117 of the image processing apparatus 110, and stored into a storage device such as the HDD 114 under the control of the system control unit 111. FIG. 3A illustrates an example of a scanned image 301 obtained through this processing. The scanned image 301 includes an area (shading dot area) 302 including shading dots printed based on shading processing.

In step S210, the system control unit 111 performs binarization processing on the scanned image, and stores the resulting binary image into the RAM 113. The binarization processing is processing of quantizing image data including multilevel gradation values into binary data, and conventional binarization techniques can be used. For example, a discriminant analysis has been known as a conventional binarization technique. However, this is not restrictive, and other binarization techniques may be used. In the following description, the binary image is described as an image including black pixels and white pixels. However, the pixel values are not limited to black and white. For example, the pixel values may be expressed by other values, such as 1 and 0. FIG. 3B illustrates an example of the result of the binarization processing performed on the scanned image 301 (binary image 303). The shading dot area 302 is also binarized and expressed as a binary shading dot area 304.

In step S220, the system control unit 111 performs shading dot removal processing on the binary image generated in step S210, and stores the resulting image into the RAM 113. Details of the shading dot removal processing will be described below with reference to FIG. 4. FIG. 3C illustrates an example of the result of the shading dot removal processing on the binary image 303 (shading dot-removed image 305). Shading dots are removed from an area 306 corresponding to the binary shading dot area 304.

The shading dot removal processing makes the character image in the shading dot area 304 into a binary image having similar image data to that of the character string on a white pixel background. Thus, performing optical character recognition (OCR) processing on such an image can improve OCR accuracy.

Figure 4:
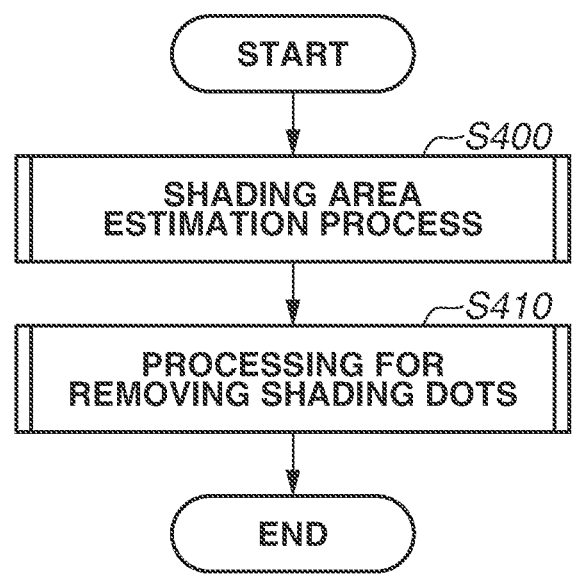
FIG. 4 is a flowchart illustrating shading dot removal processing.

Details of the shading dot removal processing in step S220 will be described with reference to the flowchart of FIG. 4. The processes of this flowchart are implemented by the system control unit 111 executing programs stored in the ROM 112.

In step S400, the system control unit 111 refers to the RAM 113 and obtains the scanned image. The system control unit 111 then estimates a shading area or areas (shading dot area(s)) in the scanned image, generates the estimation result as shading area information, and stores the shading area information into the RAM 113. This shading area estimation processing will be described below with reference to FIG. 5.

In step S410, the system control unit 111 refers to the RAM 113 and obtains the shading area information and the binary image. The system control unit 111 then generates a shading dot-removed binary image by removing shading dots from the area(s) indicated by the shading area information in the obtained binary image. The processing for removing shading dots will be described below with reference to FIG. 7.

Figure 5:
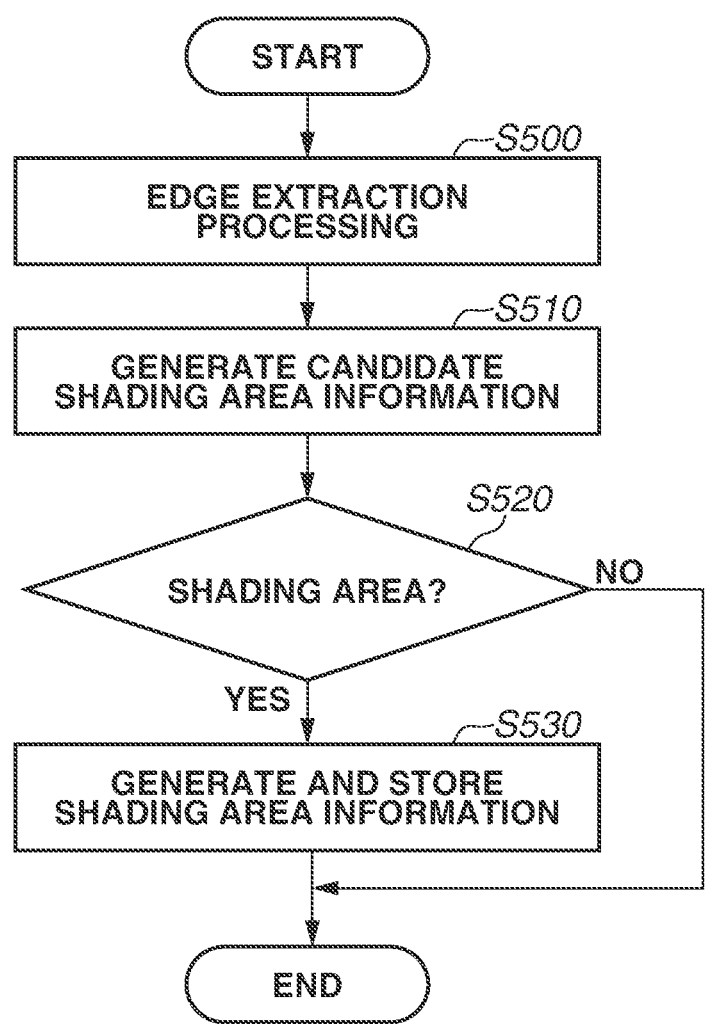
FIG. 5 is a flowchart illustrating shading area estimation processing.

Details of the shading area estimation processing in step S400 of FIG. 4 will be described with reference to the flowchart of FIG. 5.

Figure 6A:
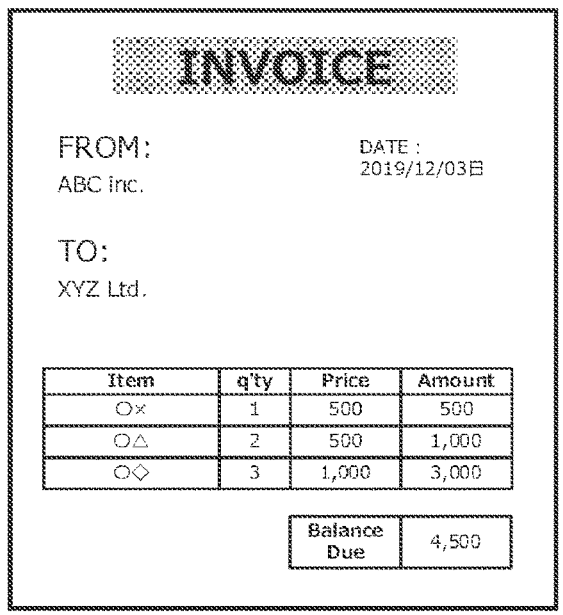
FIGS. 6A to 6E are diagrams illustrating examples of document images in the shading area estimation processing.
Figure 6B:
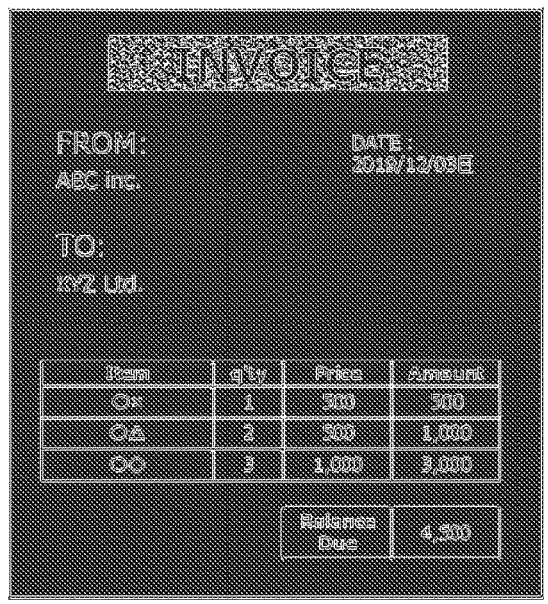

In step S500, the system control unit 111 refers to the RAM 113 and obtains the scanned image. The system control unit 111 then performs edge extraction processing on the scanned image, and stores the edge extraction result (edge image) into the RAM 113. The edge extraction processing is processing for identifying portions where the gradient of a pixel value (gradation value) between adjoining pixels is high. Conventional edge extraction techniques can be used. For example, the Canny method has been known as a conventional edge extraction technique. FIG. 6B illustrates an example of the result of the edge extraction processing on the scanned image (FIG. 6A). In the example of FIG. 6B, edge pixels (pixels where the gradient is greater than or equal to a predetermined threshold) are represented by white pixels, and non-edge pixels by black pixels.

Figure 6C:
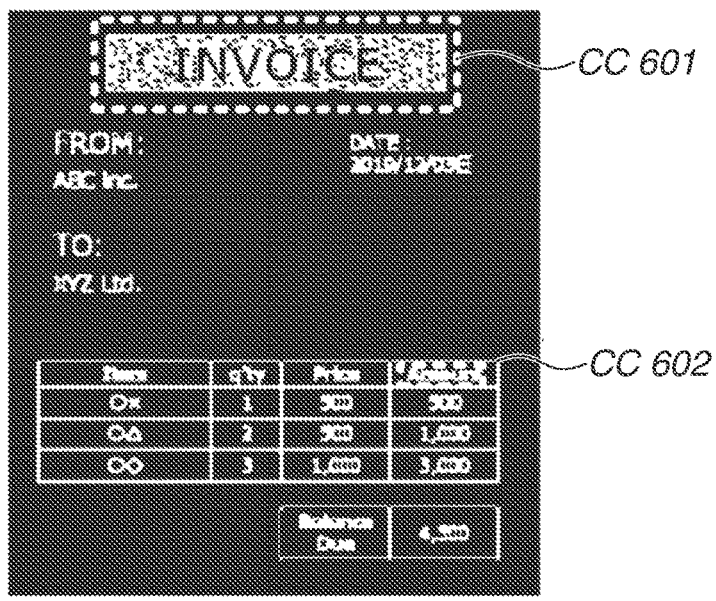

In step S510, the system control unit 111 refers to the RAM 113 and obtains the edge extraction result image (edge image). The system control unit 111 then generates candidate shading areas from the obtained edge extraction result image, and stores candidate shading area information into the RAM 113. Specifically, the system control unit 111 connects adjoining edge pixels in the edge extraction result image to each other by performing thickening processing and thinning processing that are morphological operations on the edge pixels in this order. Next, the system control unit 111 extracts connected pixel blocks (hereinafter, referred to simply as connected components (CCs)) from the image resulting from the morphological operations (morphological operation result image), and stores the bounding rectangles of the CCs into the RAM 113 as candidate shading area information. A CC is obtained by extracting edge pixels (white pixels) connected in the edge extraction result image. The pixels belonging to the same CC have information to which the same label is attached. FIG. 6C illustrating an example of a morphological operation result obtained by performing the morphological operations on the edge extraction result image (FIG. 6B). CCs 601 and 602 are examples of the extracted CCs. Bounding rectangle information about such CCs is generated as the candidate shading area information.

In the present exemplary embodiment, candidate shading areas are generated through the morphological operations and the extraction of CCs from the morphology operation result image. However, other methods may be used. For example, the outermost contours of white pixels may be obtained from the edge extraction result image, and the bounding rectangles of the contours may be used as candidate shading areas. Unlike the morphological operations and CC extraction, this method can be implemented through contour extraction processing, and can thus potentially improve processing speed and reduce computer resources such as memory.

Figure 6D:
Figure 6E:

In step S520, the system control unit 111 refers to the RAM 113 and obtains the candidate shading area information generated in step S510 and the edge extraction result image extracted in step S500. The system control unit 111 then determines whether each candidate shading area indicated by the candidate shading area information is a shading area. Specifically, the system control unit 111 extracts a partial image at a position identified by the candidate shading area information from the edge extraction result image. If the edge pixels in the extracted partial image have a pixel density (edge pixel density) higher than a predetermined threshold, the system control unit 111 determines that the candidate shading area is a shading area. If the edge pixel density in the extracted partial image is lower than or equal to the predetermined threshold, the system control unit 111 determines that the candidate shading area is not a shading area. This processing will be described with reference to FIGS. 6A to 6E. Suppose that the CCs 601 and 602 in FIG. 6C are obtained as candidate shading areas in step S510 as described above. In the processing of step S520, the system control unit 111 obtains the partial images of portions corresponding to the positions of the areas of the respective CCs 601 and 602 from the edge extraction result image (edge image) of FIG. 6B. FIG. 6D illustrates the edge extraction result image of the portion corresponding to the position of the area of the CC 601. FIG. 6E illustrates the edge extraction result image of the portion corresponding to the position of the area of the CC 602. In FIG. 6D, the edge pixel density is high and the candidate shading area is thus determined to be a shading area. By contrast, in FIG. 6E, the edge pixel density is low and the candidate shading area is determined to not be a shading area.

In step S530, the system control unit 111 generates shading area information about the candidate shading area(s) determined to be a shading area or areas in step S520, and stores the shading area information into the RAM 113. The shading area information includes position information about the bounding rectangle(s) stored as the candidate shading area information.

As described above, shading dot areas can be identified using the edge pixel density since a large number of edges are generated due to the presence of shading dots.

Figure 7:
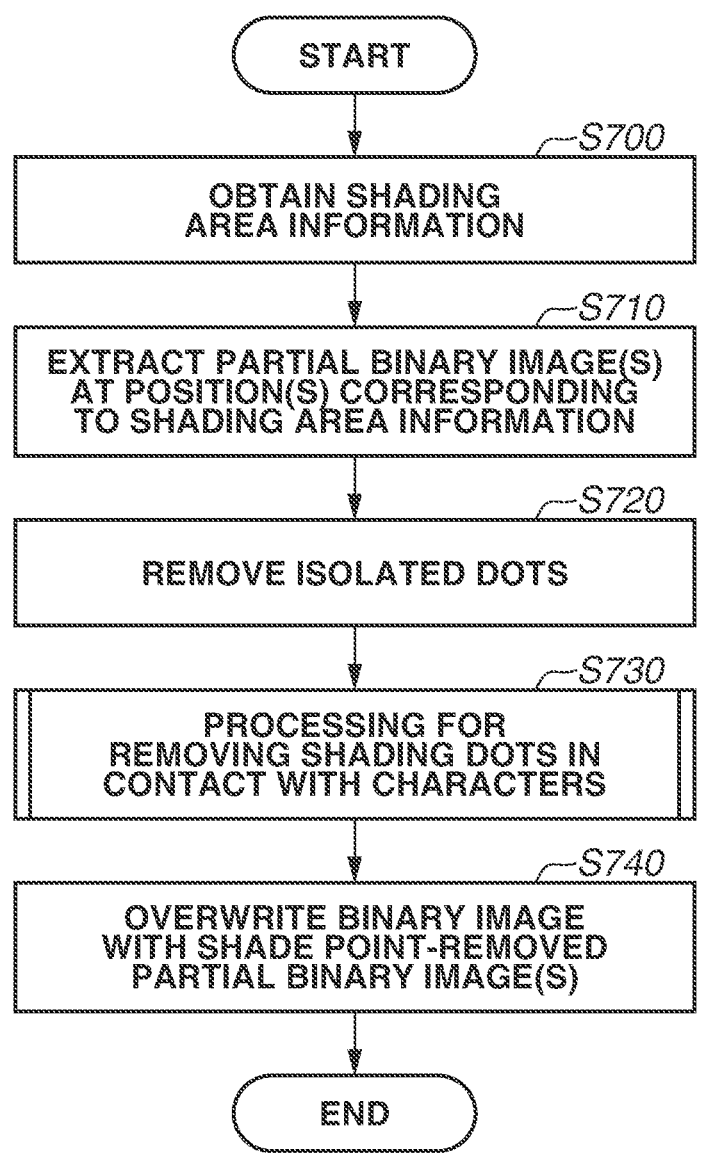
FIG. 7 is a flowchart illustrating processing for removing shading dots.

Details of the processing for removing shading dots in step S410 in FIG. 4 will be described with reference to the flowchart in FIG. 7.

In step S700, the system control unit 111 refers to the RAM 113 and obtains the shading area information (position information about the shading area(s)).

Figure 9B:

In step S710, the system control unit 111 refers to the RAM 113 and obtains the binary image generated in step S210. The system control unit 111 then extracts a partial binary image or images at a position or positions corresponding to the shading area information obtained in step S700 from the obtained binary image, and stores the partial binary image(s) into the RAM 113. FIG. 9B illustrates an example of a binary image (partial binary image) of a portion corresponding to a shading area, extracted from the binary image (FIG. 9A).

In step S720, the system control unit 111 refers to the RAM 113 and obtains the partial binary image(s) extracted in step S710. The system control unit 111 then removes pixels of isolated dots (isolated shading dots not in contact with a character) from the partial binary image(s), and stores the isolated dot-removed partial binary images into the RAM 113. Pieces of information about the portions where the isolated dots are removed are stored into the RAM 113 as an isolated dot information group.

Specifically, the system control unit 111 performs CC extraction (processing for extracting connected pixel blocks of black pixels) on the partial binary image(s), and evaluates the size of the bounding rectangle of each CC extracted. For size evaluation, if a CC has a size smaller than a predetermined threshold, the system control unit 111 determines that the CC is an isolated dot (isolated shading dot not in contact with a character), and removes the pixels corresponding to the CC from the partial binary image. The threshold here can be defined based on sizes in which a CC can be a part of a character, like the dots over i's and j's, and the sizes of punctuation marks. Excessive removal of such CCs not to be removed as shading dots, like ones constituting a part of a character, can be avoided by setting the threshold to a size smaller than those of the CCs not to be removed.

Figure 9C:

After the removal of the pixels corresponding to the CCs determined to be isolated dots from the partial binary image(s), the system control unit 111 stores the vertical and horizontal sizes (heights and widths) of the removed CCs into the RAM 113 as the isolated dot information group. FIG. 9C illustrates an example of a partial binary image obtained by removing isolated dots from the partial binary image of FIG. 9B.

In step S730, the system control unit 111 refers to the RAM 113 and obtains the partial binary image(s) from which isolated dots are removed in step S720. The system control unit 111 then removes shading dots in contact with characters from the partial binary image(s), and stores the resulting partial binary image(s) into the RAM 113. The processing of step S730 is performed because shading dots in contact with characters are difficult to be removed by removing isolated dots as described in step S720. Details of the processing of step S730 will be described below with reference to FIG. 8.

In step S740, the system control unit 111 refers to the RAM 113 and obtains the shading area information generated in step S530, the shading dot-removed partial binary image(s) generated in step S730, and the binary image (binary image of the entire document) generated in step S210. The system control unit 111 then replaces the pixel information about the binary image of the entire document at the position(s) corresponding to the shading area information with the pixel information about the shading dot-removed partial binary image(s). In other words, the system control unit 111 combines the images by overwriting the binary image of the scanned image with the shading dot-removed partial binary image(s) at the position(s) of the shading area(s).

Details of the processing for removing shading dots in contact with characters in step S730 of FIG. 7 will be described with reference to the flowchart of FIG. 8.

In step S800, the system control unit 111 refers to the RAM 113 and obtains the partial binary image(s) of the shading dot area(s) from which isolated dots are removed in step S720. The system control unit 111 then performs edge extraction processing on the partial binary image(s), and stores the edge extraction result image(s) (edge images(s) including edge pixels) into the RAM 113. The conventional techniques mentioned above may be used for the edge extraction processing. For example, borders between black and white pixels in a binary image can be extracted as edge pixels by performing the edge extraction processing on the binary image.

In step S810, the system control unit 111 refers to the RAM 113 and obtains the edge extraction result image(s) generated in step S800 and the isolated dot information group generated in step S720. The system control unit 111 then emphasizes shading dots in contact with characters by performing image processing using the isolated dot information group on the obtained edge extraction result image(s).

Specifically, the system control unit 111 calculates an average of the sizes of the CCs in the obtained isolated dot information group, and generates isolated dot information to be used in the subsequent processing. The system control unit 111 then applies morphological thickening processing to the edge extraction result image(s) as much as the size defined by the isolated dot information. More specifically, the system control unit 111 performs horizontal thickening processing as much as defined by width information stored as the isolated dot information, and performs vertical thickness processing as much as defined by height information stored as the isolated dot information. The system control unit 111 further applies morphological thinning processing to the thickened image(s), using the same size as with the thickening processing. More specifically, the system control unit 111 performs horizontal thinning processing as much as defined by the width information stored as the isolated dot information, and performs vertical thinning processing as much as defined by the height information stored as the isolated dot information. Since the isolated points have a size smaller than character line widths, the use of the isolated dot information as the morphological operation parameters can prevent, in the thickening processing, the inside of character lines from being filled up if edge pixel lines corresponding to the contours of the character lines is thickened. By contrast, the inside of shading dots is filled up through the thickening processing if edge pixel lines corresponding to the contours of the shading dots is thickened. Moreover, the edge pixel lines is thinned as much as the size defined by the isolated dot information through the thinning processing. The shading dot portions filled up inside therefore remain filled up while the edge pixel lines corresponding to the contours of the character lines not filled up inside are restored to their original sizes. As a result, an image or images in which the positions of the shading dots in contact with characters are emphasized can be obtained through the operation in step S810.

Figure 9D:
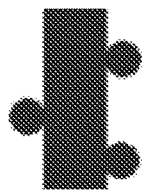
Figure 9E:
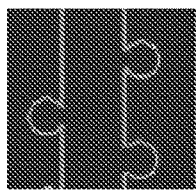
Figure 9F:
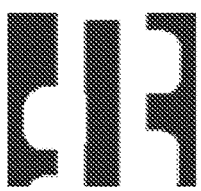
Figure 9G:
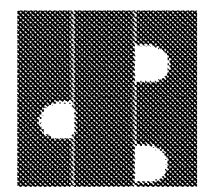

An example of the processing of step S810 will be described with reference to FIGS. 9A to 9G. FIG. 9D illustrates an example of an enlarged image of an area 901 in FIG. 9C. As illustrated in FIG. 9D, the shading dots in contact with the character are ones not removed through the processing for removing isolation points in step S720 of FIG. 7. FIG. 9E illustrates an edge extraction result image, or edge image, obtained by performing edge extraction on the image of FIG. 9D to extract edge pixels. In the edge image of FIG. 9E, edge pixels are represented by white pixels, and non-edge pixels by black pixels. FIG. 9F illustrates an image obtained by performing edge pixel (white pixel) thickening processing on the edge image (edge extraction result image) of FIG. 9E. FIG. 9G illustrates an image (emphasized image) obtained by applying white pixel thinning processing to the image of FIG. 9F. The emphasized image of FIG. 9G indicates that the portions corresponding to the shading dots in contact with the character are filled with white pixels for emphasis.

In the present exemplary embodiment, the sizes of the CCs in the isolated dot information group are averaged to determine an isolated dot size, and the determined isolated dot size is used in the processing of step S810. However, the isolated dot size to be used may be determined by other methods. For example, a maximum value (or mode or median) of the sizes of the CCs in the isolated information group can be determined and used in the thickening processing and thinning processing in step S810.

In step S820, the system control unit 111 removes the shading dots in contact with characters by replacing the pixels of the partial binary image in FIG. 9C at the positions corresponding to the white pixel portions in the emphasized image(s) determined in step S810 with white pixels.

As described above, according to the present exemplary embodiment, shading dots can be removed without advance parameter setting. In particular, in removing shading dots in contact with characters, the size of the isolated dots to be removed is dynamically determined by using the sizes of the CCs removed as isolated dots. This enables removal of the shading dots in contact with characters without deleting character pixels.

A second exemplary embodiment of the present disclosure will be described below. The first exemplary embodiment has dealt with the processing for performing the binarization processing on the entire document image in step S210 of FIG. 2 before estimating a shading area or areas in step S400 of FIG. 4 and removing shading dots from the shading area(s) estimated in step S410. In a second exemplary embodiment, a case where a shading area or areas is/are first identified from a scanned image without the binary processing on the entire document image in step S210 will be described. Here, the partial image(s) of the area(s) corresponding to the identified shading area(s) is/are then extracted and subjected to binary processing. After shading dots are removed from the resulting partial binary image(s), the shading dot-removed partial image(s) and a binary image obtained by binarizing the scanned image excluding the area(s) of the shading area(s) are combined to generate a binary image to be output.

Figure 10:
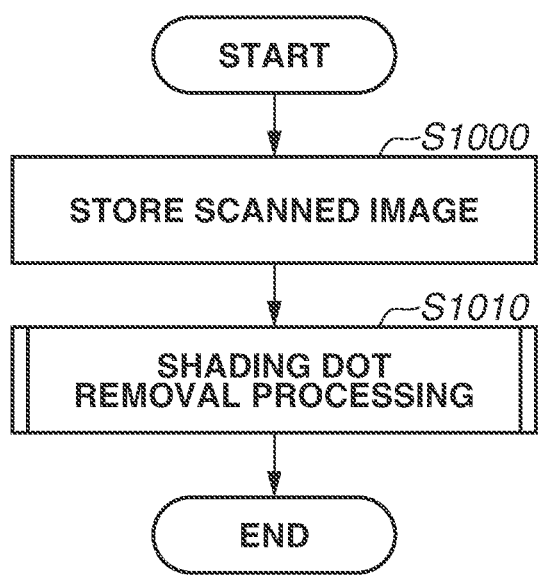
FIG. 10 is a flowchart illustrating a processing procedure according to a second exemplary embodiment.

Such a case will be described with reference to FIG. 10. FIG. 10 is a flowchart illustrating the binarization processing according to the present exemplary embodiment.

The operation in step S1000 is similar to that of step S200 in FIG. 2. In step S1000, a system control unit 111 obtains a scanned image.

In step S1010, the system control unit 111 estimates a shading area or areas and remove shading dots from the obtained scanned image to generate a shading dot-removed image. In step S1010, the system control unit 111 initially extracts edges from the scanned image as in step S500 of FIG. 5. Based on the edge extraction result image (edge image), the system control unit 111 performs shading area estimation processing similar to that of steps S510 to S530. The shading area estimation processing of FIG. 5 can be applied to the scanned image without binarization processing of the scanned image. Almost the same processing for removing shading dots as in FIG. 7 is then performed. In the second exemplary embodiment, since the scanned image is not subjected to binarization processing (step S210 of FIG. 2 according to the first exemplary embodiment) before the execution of the flowchart of FIG. 7, the system control unit 111 also performs binarization processing in step S710 of FIG. 7. In the present exemplary embodiment, the system control unit 111 obtains a partial image or images corresponding to the shading area(s) from the scanned image at the timing corresponding to the processing of step S710 in FIG. 7, and performs the binarization processing on the partial image(s) to obtain a partial binary image or images of the shading area(s). The system control unit 111 removes isolated dots from the obtained partial binary image(s) in step S720, and performs the processing for removing shading dots in contact with characters in step S730, thus obtaining a shading dot-removed partial binary image or images. If there is a setting to also binarize other areas of the scanned image than the shading area(s), the system control unit 111 performs binarization processing on the areas of the scanned image, excluding the shading area(s) estimated by the foregoing shading area estimation processing. The system control unit 111 then combines the partial binary image(s) of the shading area(s) with the binary image of the areas other than the shading area(s) to obtain a combined binary image.

To obtain the partial binary image(s) of the shading area(s), the processing can be further simplified since the binarization processing or the combination of the other areas of the scanned image than the shading area(s) is not needed.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-121673, filed Jul. 15, 2020, which is hereby incorporated by reference herein in its entirety.

What is claimed is:

1. An apparatus comprising:
at least one memory that stores instructions; and
at least one processor that executes the instructions to perform:
removing an isolated dot from an image including a shading dot; and
removing a shading dot in contact with a character from the isolated dot-removed image based on a size of the removed isolated dot.

2. The apparatus according to claim 1, wherein the removing of the shading dot includes:
obtaining an edge image including an edge pixel by performing edge extraction processing on the isolated dot-removed image;
performing thickening processing and thinning processing on the edge pixel in the obtained edge image based on the size of the isolated dot; and
removing the shading dot in contact with the character from the isolated dot-removed image based on an image resulting from the thickening processing and the thinning processing on the edge pixel.

3. The apparatus according to claim 2, wherein the removing of the shading dot includes:
obtaining an edge image including an edge pixel by performing edge extraction processing on the isolated dot-removed image;
performing thickening processing and thinning processing on the edge pixel in the obtained edge image both in a horizontal direction and in a vertical direction based on width and height sizes of the isolated dot; and
removing the shading dot in contact with the character from the isolated dot-removed image based on an image resulting from the thickening processing and the thinning processing on the edge pixel.

4. The apparatus according to claim 1, wherein the image including the shading dot is a binary image of a portion corresponding to a shading area estimated from a scanned image.

5. The apparatus according to claim 4, wherein the shading area is estimated based on a pixel density of edge pixels in an image obtained by performing the edge extraction processing on the scanned image.

6. The apparatus according to claim 4, wherein the image from which the shading dot in contact with the character has been removed is combined with a binary image of the scanned image at a position corresponding to the estimated shading area.

7. A method comprising:
removing an isolated dot from an image including a shading dot; and
removing a shading dot in contact with a character from the isolated dot-removed image based on a size of the removed isolated dot.

8. The method according to claim 7, wherein the removing of the shading dot includes:
obtaining an edge image including an edge pixel by performing edge extraction processing on the isolated dot-removed image;
performing thickening processing and thinning processing on the edge pixel in the obtained edge image based on the size of the isolated dot; and
removing the shading dot in contact with the character from the isolated dot-removed image based on an image resulting from the thickening processing and the thinning processing on the edge pixel.

9. The method according to claim 8, wherein the removing of the shading dot includes:
obtaining an edge image including an edge pixel by performing edge extraction processing on the isolated dot-removed image;
performing thickening processing and thinning processing on the edge pixel in the obtained edge image both in a horizontal direction and in a vertical direction based on width and height sizes of the isolated dot; and
removing the shading dot in contact with the character from the isolated dot-removed image based on an image resulting from the thickening processing and the thinning processing on the edge pixel.

10. The method according to claim 7, wherein the image including the shading dot is a binary image of a portion corresponding to a shading area estimated from a scanned image.

11. The method according to claim 10, wherein the shading area is estimated based on a pixel density of edge pixels in an image obtained by performing the edge extraction processing on the scanned image.

12. The method according to claim 10, wherein the image from which the shading dot in contact with the character has been removed is combined with a binary image of the scanned image at a position corresponding to the estimated shading area.

13. A non-transitory computer readable storage medium storing instructions that causes a computer to perform:
removing an isolated dot from an image including a shading dot; and
removing a shading dot in contact with a character from the isolated dot-removed image based on a size of the removed isolated dot.

14. The non-transitory computer readable storage medium according to claim 13, wherein the removing of the shading dot includes:
obtaining an edge image including an edge pixel by performing edge extraction processing on the isolated dot-removed image;
performing thickening processing and thinning processing on the edge pixel in the obtained edge image based on the size of the isolated dot; and removing the shading dot in contact with the character from the isolated dot-removed image based on an image resulting from the thickening processing and the thinning processing on the edge pixel.

15. The non-transitory computer readable storage medium according to claim 14, wherein the removing of the shading dot includes:

obtaining an edge image including an edge pixel by performing edge extraction processing on the isolated dot-removed image;

performing thickening processing and thinning processing on the edge pixel in the obtained edge image both in a horizontal direction and in a vertical direction based on width and height sizes of the isolated dot; and removing the shading dot in contact with the character from the isolated dot-removed image based on an image resulting from the thickening processing and the thinning processing on the edge pixel.

16. The non-transitory computer readable storage medium according to claim 13, wherein the image including the shading dot is a binary image of a portion corresponding to a shading area estimated from a scanned image.

17. The non-transitory computer readable storage medium according to claim 16, wherein the shading area is estimated based on a pixel density of edge pixels in an image obtained by performing the edge extraction processing on the scanned image.

18. The non-transitory computer readable storage medium according to claim 16, wherein the image from which the shading dot in contact with the character has been removed is combined with a binary image of the scanned image at a position corresponding to the estimated shading area.

\* \* \* \* \*